United States Patent
Zhao et al.

(10) Patent No.: US 9,859,977 B2
(45) Date of Patent: Jan. 2, 2018

(54) METHOD FOR ESTIMATING CHANNEL POWER, METHOD FOR MONITORING FREQUENCY SPECTRUM CHARACTERISTIC, APPARATUS AND SYSTEM

(71) Applicant: FUJITSU LIMITED, Kawasaki (JP)

(72) Inventors: Ying Zhao, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/075,862

(22) Filed: Mar. 21, 2016

(65) Prior Publication Data

US 2016/0308612 A1  Oct. 20, 2016

(30) Foreign Application Priority Data

Apr. 15, 2015 (CN) .......................... 2015 1 0177838

(51) Int. Cl.
*H04B 10/69* (2013.01)
*H04B 10/079* (2013.01)
*G01J 3/00* (2006.01)

(52) U.S. Cl.
CPC .......... *H04B 10/07955* (2013.01); *G01J 3/00* (2013.01); *H04B 10/07957* (2013.01)

(58) Field of Classification Search
CPC .................................................. H04B 10/697
See application file for complete search history.

(56) References Cited

U.S. PATENT DOCUMENTS

| | | | |
|---|---|---|---|
| 2013/0028595 A1* | 1/2013 | Nakagawa | H04L 27/2657 398/25 |
| 2014/0029957 A1* | 1/2014 | Sethumadhavan | H04B 10/588 398/192 |
| 2014/0086574 A1* | 3/2014 | Gariepy | H04B 10/0795 398/26 |

* cited by examiner

*Primary Examiner* — Shi K Li
(74) *Attorney, Agent, or Firm* — Staas & Halsey LLP

(57) ABSTRACT

A method, apparatus and system estimating channel power, and monitoring a frequency spectrum characteristic. A method for estimating channel power includes extracting frequency spectrum information from a received signal, so as to obtain a frequency spectrum of the received signal, estimating power of a central channel in the frequency spectra according to a power value of a flat area of the central channel, and estimating power of a neighboring channel in the frequency spectra according to a power value of a flat area of the neighboring channel. With the embodiments of the present disclosure, the power of the central channel and the power of the neighboring channel may be estimated by using only frequency spectrum information obtained by a single optical receiver, so as to quantitatively evaluate influence of a power imbalance effect, thereby ensuring precision of the power estimation, and reducing effects of nonideal factors on the estimated values.

19 Claims, 16 Drawing Sheets

METHOD FOR ESTIMATING CHANNEL POWER, METHOD FOR MONITORING FREQUENCY SPECTRUM CHARACTERISTIC, APPARATUS AND SYSTEM

CROSS-REFERENCE TO RELATED APPLICATION

This application claims the priority benefit of Chinese Patent Application No. 201510177838.2, filed on Apr. 15, 2015 in the Chinese State Intellectual Property Office, the disclosure of which is incorporated herein in its entirety by reference.

BACKGROUND

1. Field

The present disclosure relates to the field of multicarrier optical fiber communication technologies, and in particular to a method for estimating channel power, a method for monitoring a frequency spectrum characteristic, an apparatus and a system.

2. Description of the Related Art

In a multicarrier optical fiber communication system, subcarrier data are modulated in several optical carriers independent of each other, and a receiver receives and demodulates the subcarrier data respectively. Under an ideal condition, power of each subcarrier channel is stable, and a central channel received by a single receiver is less affected by neighboring channels. However, in a practical system, on the one hand, as wavelength and power of a laser are influenced by variation of driving currents, temperature fluctuation, and resonant cavity aging, etc., output carrier wavelength and power will drift in a certain range; and on the other hand, when multicarrier signals pass through the transmission system, the gains of the subcarrier channels are not completely identical, which results in power of the subcarriers are inconsistent. Such indefinite variation of power brings about relatively large influence to the multicarrier optical communication system, which is mainly embodied in: 1) as the power of the neighboring channels are over large, neighboring channel crosstalk occurs in the central channel in demodulation; and 2) power imbalance results in relatively large errors in system monitoring amount, such as subcarrier interval monitoring amount, and optical signal to noise ratio monitoring amount, etc.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

It was found by the inventors in the implementation of the present disclosure that effective subcarrier channel power estimation is important means for overcoming power imbalance. On a basis of power detection, a magnitude of neighboring crosstalk may be early warned and a monitoring amount of a receiver may be necessarily modified, so as to prevent the receiver from severe influence. It can be seen that subcarrier channel power estimation is a basis for realization of elimination of influence of the power imbalance, and is effective means for further optimizing the multicarrier optical fiber communication system. Extra hardware overhead is not expected to be introduced in the process of realizing the power estimation, hence, attention is paid to a scheme where wavelength monitoring based on digital signal processing is performed in a receiver.

Embodiments of the present disclosure provide a method for estimating channel power, a method for monitoring a frequency spectrum characteristic, apparatus and a system; wherein based on signal processing performed in the optical receiver, power information of subcarrier channels is obtained without introducing over high complexity.

According to a first aspect of the embodiments of the present disclosure, there is provided an apparatus for estimating channel power, applicable to an optical receiver, the apparatus including: an acquiring unit configured to acquire a received signal; an extracting unit configured to extract frequency spectrum information from the received signal to obtain a frequency spectrum of the received signal; a first estimating unit configured to estimate power of a central channel in the frequency spectrum according to a power value of a flat area of the central channel; and a second estimating unit configured to estimate power of a neighboring channel in the frequency spectrum according to a power value of a flat area of the neighboring channel.

According to a second aspect of the embodiments of the present disclosure, there is provided a method for estimating channel power, applicable to an optical receiver, the method including: acquiring a received signal; extracting frequency spectrum information from the received signal to obtain a frequency spectrum of the received signal; estimating power of a central channel in the frequency spectrum according to a power value of a flat area of the central channel; and estimating power of a neighboring channel in the frequency spectrum according to a power value of a flat area of the neighboring channel.

According to a third aspect of the embodiments of the present disclosure, there is provided an optical receiver, including the apparatus for estimating channel power as described in the first aspect.

According to a fourth aspect of the embodiments of the present disclosure, there is provided an apparatus for monitoring a frequency spectrum characteristic, applicable to an optical receiver, the apparatus including: an estimating unit configured to acquire a received signal, extract frequency spectrum information from the received signal to obtain a frequency spectrum of the received signal, determine power of a central channel in the frequency spectrum according to a power value of a flat area of the central channel, and determine power of a neighboring channel in the frequency spectrum according to a power value of a flat area of the neighboring channel; and a monitoring unit configured to monitor a frequency spectrum characteristic by using the power of the central channel and the power of the neighboring channel estimated by the estimating unit.

According to a fifth aspect of the embodiments of the present disclosure, there is provided a method for monitoring a frequency spectrum characteristic, applicable to an optical receiver, the method including: acquiring a received signal, extracting frequency spectrum information from the received signal to obtain a frequency spectrum of the received signal, determining power of a central channel in the frequency spectrum according to a power value of a flat area of the central channel, and determining power of a neighboring channel in the frequency spectrum according to a power value of a flat area of the neighboring channel; and monitoring a frequency spectrum characteristic by using the power of the central channel and the power of the neighboring channel.

According to a sixth aspect of the embodiments of the present disclosure, there is provided an optical receiver, including the apparatus for monitoring a frequency spectrum characteristic as described in the fourth aspect.

According to a seventh aspect of the embodiments of the present disclosure, there is provided a multicarrier optical communication system, including the optical receiver as described in the third or the sixth aspect.

An advantage of the embodiments of the present disclosure exists in that with the embodiments of the present disclosure, the power of the central channel and the power of the neighboring channel may be estimated by using only frequency spectrum information obtained by a single optical receiver, so as to quantitatively evaluate influence of a power imbalance effect.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Figure 1:
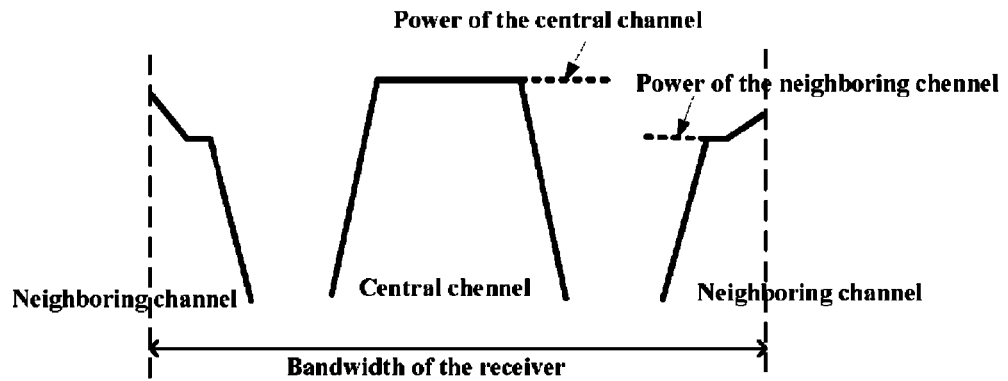
FIG. 1 is a schematic diagram of a principle of power estimation of an embodiment of the present disclosure.

FIG. 1 is a schematic diagram of a principle of power estimation of an embodiment of the present disclosure. As shown in FIG. 1, in a bandwidth range of an optical receiver, besides a central channel needing to be demodulated, left and right parts neighboring channel information received at the same time is also included. As the bandwidth range of the optical receiver is limited, only part of the left and right neighboring channel information is received, which is reflected in the frequency spectrum by a range between two dotted lines shown in the figure. It can be seen from FIG. 1 that a frequency spectrum of the central channel is relatively flat in a certain range, hence, a power value of this flat area needs only to be determined and is taken as power of the central channel. While due to influence of nonideal factors, received information on the neighboring channels is incomplete, which results in flat areas of the neighboring channels are not obvious, but estimation of power of the neighboring channels may be realized by making the flat areas of the neighboring channels obvious through eliminating the influence of the nonideal factors.

The embodiments of the present disclosure shall be described below with reference to the drawings and particular embodiments.

Embodiment 1

Figure 2:
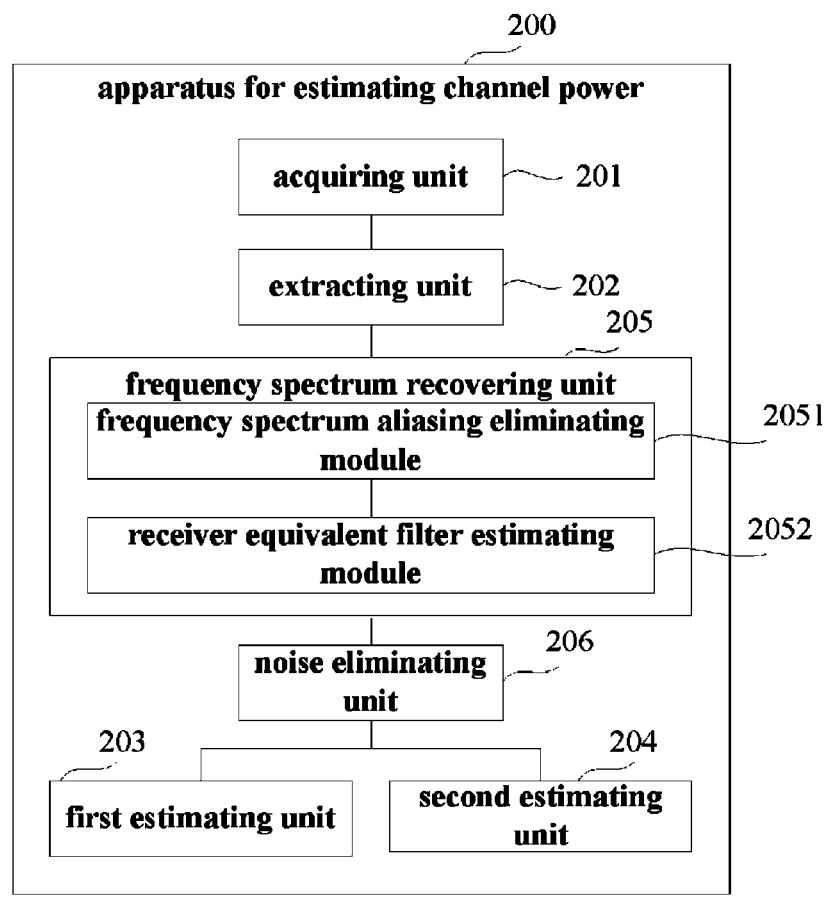
FIG. 2 is a schematic diagram of a structure of the apparatus for estimating channel power of an embodiment of the present disclosure.

An embodiment of the present disclosure provides an apparatus for estimating channel power, applicable to a multicarrier optical receiver. FIG. 2 is a schematic diagram of a structure of the apparatus. Referring to FIG. 2, the apparatus 200 includes: an acquiring unit 201, an extracting unit 202, a first estimating unit 203 and a second estimating unit 204. In this embodiment, the acquiring unit 201 is configured to acquire a received signal, the extracting unit 202 is configured to extract frequency spectrum information from the received signal to obtain a frequency spectrum of the received signal, the first estimating unit 203 is configured to estimate power of a central channel in the frequency spectrum according to a power value of a flat area of the central channel, and the second estimating unit 204 is configured to estimate power of a neighboring channel in the frequency spectrum according to a power value of a flat area of the neighboring channel.

In this embodiment, the received signal is a signal received by said optical receiver, and as a receiving bandwidth of the optical receiver is limited, when the received signal is reflected in a frequency spectrum, a complete subcarrier signal (a signal of a central channel) and two incomplete subcarrier signals (signals of left and right neighboring channels) are included. On the one hand, the optical receiver performs conventional processing on the received signal, such as photoelectric conversion, digital-to-analog conversion, demodulation and decoding, etc.; and on the other hand, the optical receiver performs power estimation on the above subcarrier signals by using the received signal. In this embodiment, the received signal is acquired first by the acquiring unit 201.

In this embodiment, the extracting unit 202 may extract the frequency spectrum information from the received signal to obtain a frequency spectrum of the received signal.

Figure 3:
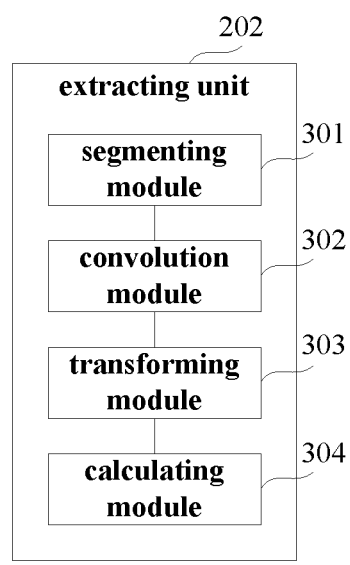
FIG. 3 is a schematic diagram of a structure of an extracting unit of the apparatus for estimating channel power in FIG. 2.
Figure 4:
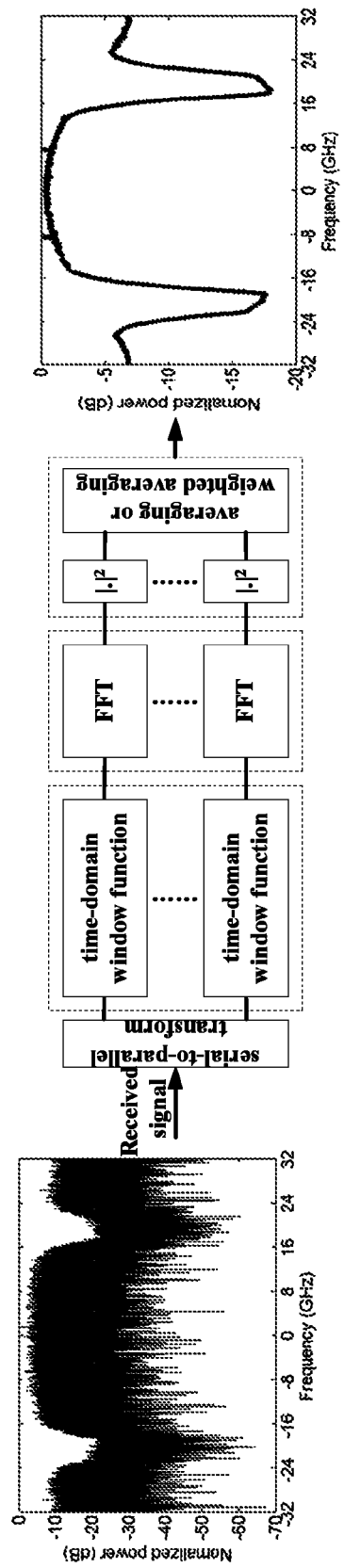
FIG. 4 is a schematic diagram of a process of frequency spectrum processing of the extracting unit of the apparatus for estimating channel power in FIG. 2.

FIG. 3 is a schematic diagram of a structure of an implementation of the extracting unit 202, and FIG. 4 is a schematic diagram of a process of extracting a frequency spectrum. As shown in FIG. 3, in this implementation, the extracting unit 202 includes: a segmenting module 301, a convolution module 302, a transforming module 303 and a calculating module 304.

In this embodiment, the segmenting module 301 is configured to segment the received signal into the predetermined number of sections. The received signal may be sampling sequences of M×N points extracted from the optical receiver, the frequency spectrum of which being as shown at the left side in FIG. 4 and reflecting shapes of subcarrier channels. As randomness of data signals, the frequency spectrum fluctuate in a very large range. And as only envelope information of the frequency spectrum is needed in estimation of power of a subcarrier channel, random data should be removed. In this implementation, the segmenting module 301 first performs serial-to-parallel transform on the sampling sequences of M×N points, which are transformed into M sections of sub-sequences, each section having N points. In this embodiment, overlapped parts may be exist between the sections of sub-sequences, that is, M sections of sub-sequences may be or may not be correlated.

In this embodiment, the convolution module 302 is configured to perform window function convolution on each section of signals segmented by the segmenting module 301. For example, the convolution module 302 multiplies each of the above sections of sub-sequences by a time-domain window function, so as to correspond to frequency-domain window function convolution, thereby realizing effective frequency spectrum smoothness. The convolution module 302 is alternative, and in an implementation, the extracting unit 202 may not include the convolution module 302.

In this embodiment, the transforming module 303 is configured to perform Fourier transform on each section of signals, and each section of signals here may be each section of sub-sequences segmented by the segmenting module 301, and may also be each section of sub-sequences convoluted by the convolution module 302. And in this embodiment, a frequency spectrum of each section of sub-sequences may be obtained by performing Fourier transform on each section of signals respectively.

In this embodiment, the calculating module 304 is configured to calculate a modular square of each section of signals, and perform averaging or weighted averaging on modular squares of all sections of signals to obtain the frequency spectrum of the received signal. And in this embodiment, a power spectrum shape in frequency domain may be reflected by calculating the modular square of each section of signals, and the frequency spectrum of the received signal may be obtained finally by performing averaging or weighted averaging on power spectra of M sections. Hence, random data in each section of sub-sequences may be effectively suppressed after the averaging, outputted smoothed frequency spectrum being as shown at the right of FIG. 4.

In this embodiment, after the frequency spectrum of the received signal is obtained, the first estimating unit 203 may determine the power of the central channel according to power of the flat area of the central channel in the frequency spectrum. As shown in right of FIG. 4, the frequency spectrum of the received signal includes frequency spectrum of the central channel and frequency spectra of the neighboring channels, the frequency spectrum of the central channel is relatively flat in a certain frequency range, the frequency range is referred to as flat area of the central channel, the first estimating unit 203 may determine the power of the central channel by using the power of the flat area. For example, power to which all frequencies in the flat area correspond may be averaged, and the averaged power may be taken as the power of the central channel.

In this embodiment, after the frequency spectrum of the received signal is obtained, the second estimating unit 204 may determine the power of a neighboring channel according to the power of the flat area of the neighboring channel. As shown in the right of FIG. 4, although frequency spectra of the left and right neighboring channels of the central channel are not flat, they can still be seen, and the second estimating unit 204 may average power to which frequencies in a certain frequency spectrum ranges of the left and right neighboring channels correspond, and take the averaged power as the power of the left and right neighboring channels. For example, for the left neighboring channel of the central channel, power to which frequencies in a frequency spectrum range of −30~−25 correspond may be averaged, and the averaged power is taken as the power of the left neighboring channel; and for the right neighboring channel of the central channel, power to which frequencies in a frequency spectrum range of 25~30 correspond may be averaged, and the averaged power is taken as the power of the right neighboring channel.

With the apparatus for estimating channel power of this embodiment, the power of the central channel and the power of neighboring channels are estimated by using the frequency spectrum information received from a single receiver, thereby influence of a power imbalance effect may be evaluated quantitatively.

In this embodiment, as shown in FIG. 2, the apparatus for estimating channel power further includes a frequency spectrum recovering unit 205 configured to perform frequency spectrum recovery on the frequency spectrum of the received signal extracted by the extracting unit 202. Hence, the first estimating unit 203 may determine the flat area of the central channel according to the frequency spectrum recovered by the frequency spectrum recovering unit 205, and estimate a power of the central channel according to the flat area of the central channel, a estimation method being as described above, and being not going to be described herein any further; furthermore, the second estimating unit 204 may determine the flat area of a neighboring channel according to the frequency spectrum recovered by the frequency spectrum recovering unit 205, and estimates the power of the neighboring channel according to the flat area of the neighboring channel. In an implementation, the frequency spectrum recovering unit 205 may include a frequency spectrum aliasing eliminating module 2051 configured to eliminate distortion of a frequency spectrum aliasing effect on the received signal to obtain a frequency spectrum of the received signal without frequency spectrum aliasing effect. In this implementation, the frequency spectrum aliasing eliminating module 2051 may calculate a frequency spectrum of a neighboring channel according to the received frequency spectrum in a predetermined range around both sides of bandwidth of the receiver and a receiver equivalent filter response, so as to obtain the frequency spectrum of the received signal without frequency spectrum aliasing effect. During calculation of the frequency spectrum of the neighboring channel, it is assumed that the received frequency spectrum in the predetermined range around both sides of the digital bandwidth of the receiver are relatively flat.

In this implementation, the receiver equivalent filter response is a receiver filter response, which is denoted by $H(f)$, a received frequency spectrum in the predetermined range around both sides of the digital bandwidth of the receiver is denoted by $P''(f)$, and the frequency spectrum of the neighboring channel may be determined according to $H(f)$ and $P''(f)$ in this implementation, such as $P_{left}(-32+\Delta f)$ and $P_{right}(32-\Delta f)$. A principle of calculation shall be described below.

Figure 5:
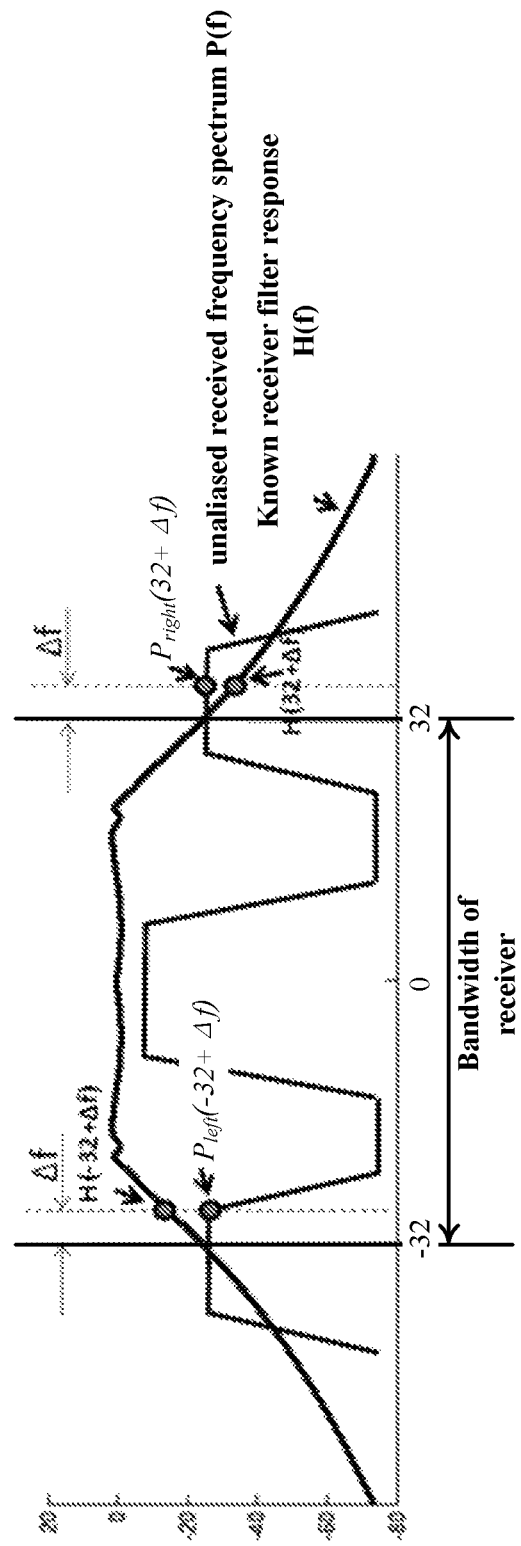
FIG. 5 is a schematic diagram of a principle of a frequency spectrum aliasing effect.

As shown in FIG. 1, the frequency spectrum will not be flat as the neighboring channel power is subjected to non-ideal factors, in which a most obvious nonideal factor is an aliasing effect in a process of analog/digital conversion of the receiver. The principles of the aliasing effect is as shown in FIG. 5, in which an unaliased received frequency spectrum $P(f)$ is an analog input signal of the receiver, area near the neighboring channel is flat, and this input signal is first filtered by the receiver filter $H(f)$ shown in FIG. 5. Hence, the output signal $P'(f)$ after being filtered may be expressed as:

$$P'(f)=H(f)\cdot P(f).$$

Besides the function of filtering, the receiver further performs a necessary process of analog/digital conversion, that is, converting analog signals into digital signals by a sampling circuit. In performing the process of analog/digital conversion, as shown in FIG. 5, as the digital bandwidth of the receiver is limited, which is set as ±32 GHz, and cannot cover a whole analog bandwidth range, it will be resulted in that a frequency spectrum aliasing phenomenon occurs in the analog signal after the process of analog/digital conversion, and the aliasing phenomenon will result in that the digital output frequency spectrum of the receiver is expressed as:

$$P''(f)=P'(f)+P'(f+64)+P'(f-64).$$

As shown in FIG. 5, as the frequency range to which the embodiment of the present disclosure is addressed is limited to a range of $-32+\Delta f$ and $32-\Delta f$ near the neighboring channels, relationships between aliasing output near the left and right neighboring channels and an original input frequency spectrum may be written as:

$$P''(-32+\Delta f)=H(-32+\Delta f)\cdot P_{left}(-32+\Delta f)+H(32+\Delta f)\cdot P_{right}(32+\Delta f),$$

$$P''(32-\Delta f)=H(32-\Delta f)\cdot P_{right}(32-\Delta f)+H(-32-\Delta f)\cdot P_{left}(-32-\Delta f);$$

in the formulae, $P_{left}$ and $P_{right}$ are frequency spectra of the original analog input near the left and right neighboring channels, respectively. Four unknown numbers are included in the above equation, which are $P_{left}(-32-\Delta f)$, $P_{left}(-32+\Delta f)$, $P_{right}(32-\Delta f)$ and $P_{right}(32+\Delta f)$, respectively. In order to calculate these four unknown numbers, other two constraint conditions need to be introduced. And as it was assumed before that the unaliased received frequency spectrum $P(f)$ is flat near the neighboring channel, other two equations may be introduced:

$$P_{left}(-32-\Delta f)=P_{left}(-32+\Delta f),$$

$$P_{right}(32-\Delta f)=P_{right}(32+\Delta f).$$

The frequency spectra near the flat ranges of the neighboring channels may be calculated from the above four equations based on the aliased frequency spectrum $P''(f)$:

$$P_{left}(-32+\Delta f)=\frac{P''(-32+\Delta f)\cdot H(32-\Delta f)-P''(32-\Delta f)\cdot H(32+\Delta f)}{H(-32+\Delta f)\cdot H(32-\Delta f)-H(32+\Delta f)\cdot H(-32-\Delta f)},$$

$$P_{right}(32-\Delta f)=$$

$$\frac{P''(-32+\Delta f)\cdot H(-32-\Delta f)-P''(32-\Delta f)\cdot H(-32+\Delta f)}{H(32+\Delta f)\cdot H(-32-\Delta f)-H(-32+\Delta f)\cdot H(32-\Delta f)}.$$

Hence, the frequency spectra of the neighboring channels before aliasing are obtained, thereby the influence of the frequency spectrum aliasing may be eliminated.

With the aliasing eliminating module 2051 of the implementation, the influence of the frequency spectrum aliasing is eliminated, the output frequency spectrum may reduce the influence of the nonideal aliasing effect of the receiver to a great extent, and lay a foundation for recovering flat neighboring channels. And precision of the power estimation is ensured, and an effect of a nonideal factor of the frequency spectrum aliasing on the estimated power is eliminated.

It should be noted here that when the receiver filter response $H(f)$ is relatively ideal, that is, when a response out of the digital bandwidth of the receiver is relatively small, the aliasing eliminating module 2051 will degraded to a general processing mode of the frequency spectrum recovering unit 205. Seen from the mathematical expression, the response out of the digital bandwidth of the receiver being relatively small is embodied as values of H(32+Δf) and H(−32−Δf) are very small, hence, the expressions $P_{left}(-32+\Delta f)$ and $P_{right}(32-\Delta f)$ of the neighboring channels are degraded as:

$$P_{left}(-32+\Delta f) = \frac{P''(-32+\Delta f)}{H(-32+\Delta f)},$$

$$P_{right}(32-\Delta f) = \frac{P''(32-\Delta f)}{H(32-\Delta f)}.$$

Figure 6:
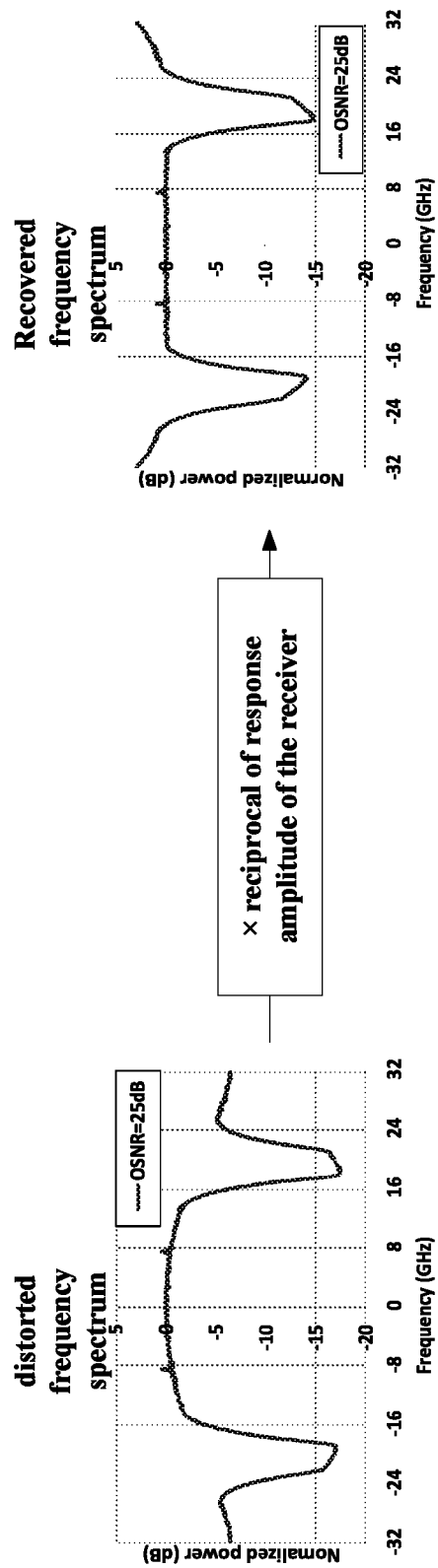
FIG. 6 is a schematic diagram of an operational principle of a frequency spectrum recovering unit of the apparatus for estimating channel power in FIG. 2.

FIG. 6 is a schematic diagram of an implementation of the frequency spectrum recovering unit 205. In this embodiment, the frequency spectrum information extracted by the extracting unit 202, that is, a smoothed frequency spectrum with influence of random data being removed, is shown in the left frequency spectrum diagram in FIG. 6. As the frequency spectrum response of the receiver is not flat, distortion of the frequency spectra of the neighboring channels is relatively severe. If no frequency spectrum recovery is performed, a relatively large error in power estimation shall be resulted.

In this implementation, frequency spectrum recovery may be performed by the frequency spectrum recovering unit 205 on smooth distorted frequency spectrum, and a particular method may be multiplying each frequency point of the distorted frequency spectrum by a correction coefficient. In this implementation, the correction coefficient may be a reciprocal of response amplitude of the receiver at each frequency point, and may also be other values. After such an operation, recovered frequency spectrum is as shown in the right frequency spectrum diagram in FIG. 6. The frequency spectrum of the central channel is smoothed while the power of the neighboring channels are outstandingly improved. And precision of estimation of gap width by using such a frequency spectrum will be obviously improved.

In this implementation, there exist a pair of pilot signals at positions of ±8 GHz in the left and right frequency spectrum diagrams in FIG. 6, which are not necessary in this implementation, and do not have an effect on the precision of the estimation of the gap.

In another implementation, besides the frequency spectrum aliasing eliminating module 2051, the frequency spectrum recovering unit 205 further includes a receiver equivalent filter estimating module 2052 configured to estimate the receiver equivalent filter response according to output of the frequency spectrum aliasing eliminating module 2051, and provide the receiver equivalent filter response to the frequency spectrum aliasing eliminating module 2051, until a maximum number of times of iteration is reached or the neighboring channel reaches a certain flatness.

In this implementation, the receiver equivalent filter response used for calculating the power of the neighboring channels is not the real receiver filter response H(f), but is an equivalent receiver filter response, which is denoted by H'(f), used for eliminating the frequency spectrum distortion resulted from the previous segmentation averaging, and is obtained by gradual calculation by using an iteration method.

In this implementation, the receiver equivalent filter estimating module 2052 estimates the receiver equivalent filter response H'(f) according to the output P(f) of the frequency spectrum aliasing eliminating module 2051, the receiver filter response H(f) and a window function W(f) used in the segmentation averaging. Calculation principles of this implementation shall be described below.

In the previous implementation, the frequency spectrum aliasing eliminating module 2051 needs to know the frequency spectrum response H(f) of the receiver filter, and flat neighboring channels may be ideally recovered by bringing H(f) into the frequency spectrum aliasing eliminating module 2051 on the premise of performing no averaging on the frequency spectrum of the received signal. However, a practical case is that after the signals are received, smoothing operations need to be perform first on them. The smoothing operations are carried out by data segmentation averaging, and such segmentation averaging causes distortion of the frequency spectrum of the received signal to some extent, such distortion being especially obvious near the neighboring channels. Thus, if the frequency spectrum distortion introduced by the segmentation averaging is not corrected, it will become another unideal factor affecting flatness of the neighboring channels. Hence, the receiver equivalent filter estimating module 2052 of this implementation is a corresponding measure for eliminating this unideal factor.

Figure 7:
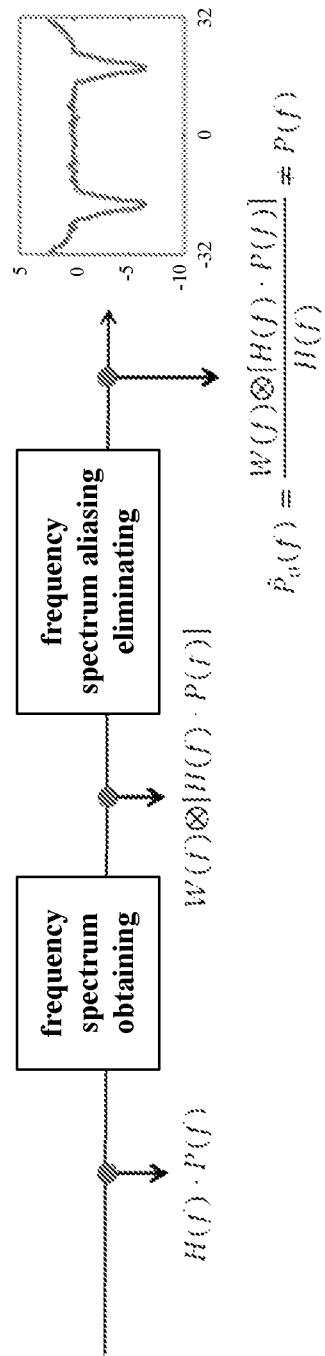
FIG. 7 is a schematic diagram of frequency spectrum distortion introduced by segmentation averaging.

FIG. 7 is a schematic diagram of frequency spectrum distortion introduced by segmentation averaging. As shown in FIG. 7, if the receiver equivalent filter estimating module 2052 of this implementation is not incorporated, frequency spectrum outputted by the frequency spectrum aliasing eliminating module 2051 may be expressed as:

$$\hat{P}_0(f) = \frac{W(f) \otimes [H(f) \cdot P(f)]}{H(f)};$$

where, W(f) is a window function used by segmentation operation; and the segmentation averaging makes the output of the extracting unit 202 is not H(f)·P(f) any longer, but become into convolution W(f)⊗[H(f)·P(f)] of the window function and the original output frequency spectrum, hence, it results in that the frequency spectrum $\hat{P}_0(f)$ outputted by the aliasing eliminating module 2051 is not equal to P(f) any longer, thereby introducing frequency spectrum distortion, as shown in the right frequency spectrum diagram in FIG. 7.

In order that the frequency spectrum outputted by the frequency spectrum aliasing eliminating module 2051 becomes back into P(f), in this implementation, the receiver equivalent filter estimating module 2052 is applied. In this implementation, the frequency spectrum aliasing eliminating module 2051 is made not to use H(f) as the response of the receiver filter any longer, but use a receiver equivalent filter response H'(f), which is expressed as:

$$H'(f) = \frac{W(f) \otimes [H(f) \cdot P(f)]}{P(f)}.$$

It can be seen that if H(f) is replaced with H'(f), the output frequency spectrum of the frequency spectrum aliasing eliminating module 2051 is P(f), and the frequency spectrum distortion will be eliminated, thereby facilitating improvement of the flatness of the neighboring channels.

Figure 8:
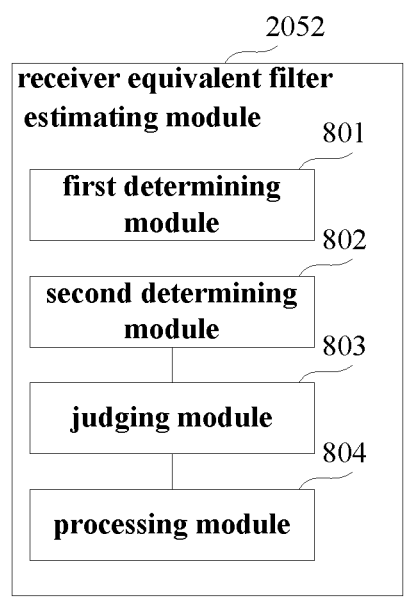
FIG. 8 is a schematic diagram of a structure of a receiver equivalent filter estimating module of the apparatus for estimating channel power in FIG. 2.

FIG. 8 is a schematic diagram of a structure of an implementation of the receiver equivalent filter estimating module 2052. As shown in FIG. 8, the receiver equivalent filter estimating module 2052 includes: a first determining module 801, a second determining module 802, a judging module 803 and a processing module 804.

In this implementation, the first determining module 801 is configured to determine the flat area of a neighboring channel according to first output of the frequency spectrum aliasing eliminating module 2051, determine the receiver equivalent filter response by taking power of at least one frequency point of the central channel as estimation power of the flat area of the neighboring channel, and provide the receiver equivalent filter response to the frequency spectrum aliasing eliminating module 2051 for calculating the frequency spectrum of the received signal with the frequency spectrum aliasing effect being eliminated; the second determining module 802 is configured to re-determine the receiver equivalent filter response according to other times of output of the frequency spectrum aliasing eliminating module 2051; the judging module 803 is configured to judge whether the maximum number of times of iteration is reached or the neighboring channel reaches a certain flatness; and the processing module 804 is configured to end processing when it is judged yes by the judging module 803, and provide the receiver equivalent filter response re-determined by the second determining module 802 to the frequency spectrum aliasing eliminating module 2051 for further processing when it is judged no by the judging module 803. In this implementation, a calculation equation of the receiver equivalent filter response H'(f) is as described above, and shall not be described herein any further. And in this implementation, the power of at least one frequency point of the central channel may be for example power of one frequency point of the central channel, or may be average power of multiple frequency points of the central channel.

A calculation principle of this implementation shall be described below.

Figure 9:
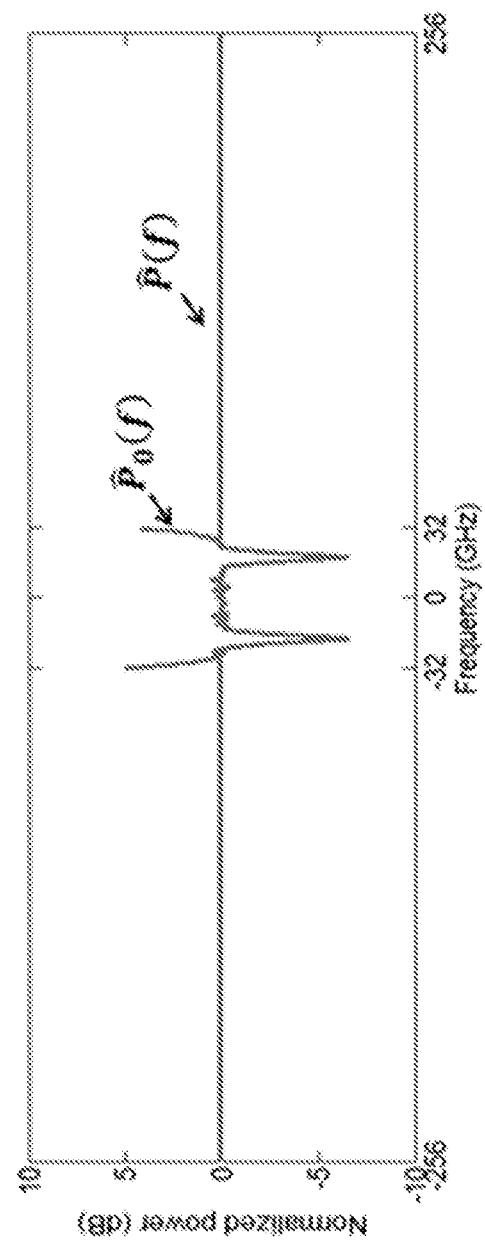
FIG. 9 is a schematic diagram of estimating P(f) to calculate H'(f)
Figure 10:
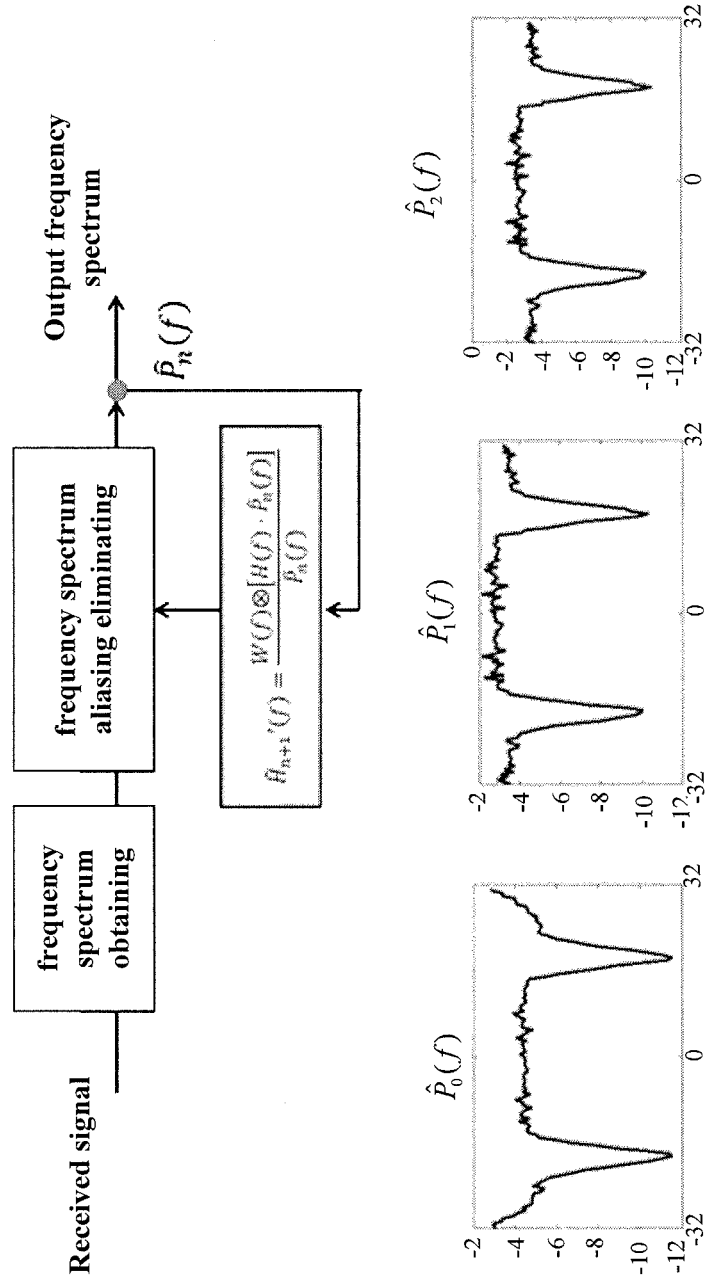
FIG. 10 is a schematic diagram of an estimation process of an estimating module of a second determining unit of the apparatus for estimating channel power in FIG. 2.

It can be seen from the above expression of H'(f) that P(f) is actually a quantity to be calculated, but not a known quantity, hence, accurately obtaining P(f) or H'(f) is impossible, and an approximation method needs to be considered further. In this implementation, a policy in which an iteration method is used to gradually approach H'(f) is proposed. First, in a state where H'(f) is completely unknown, first-step output $\hat{P}_0(f)$ of the frequency spectrum aliasing eliminating module 2051 is used to approximately estimate P(f), which is brought into the expression of H'(f). As shown in FIG. 9, obvious frequency spectrum distortion exists in the first-step output $\hat{P}_0(f)$ near the neighboring channels. As it is priori known that the neighboring channels should have flatness characteristics, the neighboring channels are extended and are compulsively set as being flat. Power of the flat part is determined by power of at least one frequency point of the central channel, and a frequency spectrum range of the flat part is extended to a certain value within the bandwidth of the receiver (which is 5 GHz in this implementation). With such correction, a firs-step coarse estimation result $\hat{P}(f)$ of P(f) is obtained, and a firs-step iterative $H_1'(f)$ is obtained by bringing $\hat{P}(f)$ into the expression of H'(f). As shown in FIG. 10, based on this $H_1'(f)$, the frequency spectrum aliasing eliminating module 2051 may give a new frequency spectrum estimation value $\hat{P}_1(f)$, and then a second-step iterative $H_2'(f)$ may be calculated based on $\hat{P}_1(f)$, thereby iteration is formed, and the actual H'(f) may be gradually approached.

With the receiver equivalent filter estimating module 2052 of this implementation, the frequency spectrum distortion resulted from the segmentation averaging may be eliminated by replacing H(f) with the equivalent filter response H'(f), hence, P(f) may be estimated according to the output of the frequency spectrum aliasing eliminating module 2051, and the unknown parameter P(f) in the expression of H'(f) may be gradually calculated by using the iteration method. And precision of the power estimation is ensured, and an effect of a nonideal factor of the segmentation averaging on the estimated values is eliminated.

In this implementation, as shown in FIG. 2, alternatively, the apparatus 200 for estimating channel power may further include a noise eliminating unit 206. In this implementation, the noise eliminating unit 206 may be provided between the frequency spectrum recovering unit 205 and the first estimating unit 203 as well as the second estimating unit 204, and is configured to determine a noise floor amplitude of the frequency spectrum recovered by the frequency spectrum recovering unit 205, deduct a value of the noise floor amplitude from each frequency point of the frequency spectrum to obtain signals with noises being eliminated, and provide the signals to the first estimating unit 203 and the second estimating unit 204. Furthermore, the noise eliminating unit 206 may also be provided between the extracting unit 202 and the frequency spectrum recovering unit 205, so as to determine a noise floor amplitude of the frequency spectrum extracted by the extracting unit 202, deduct a value of the noise floor amplitude from each frequency point of the frequency spectrum to obtain signals with noises being eliminated, and provide the signals to the frequency spectrum recovering unit 205.

Figure 11:
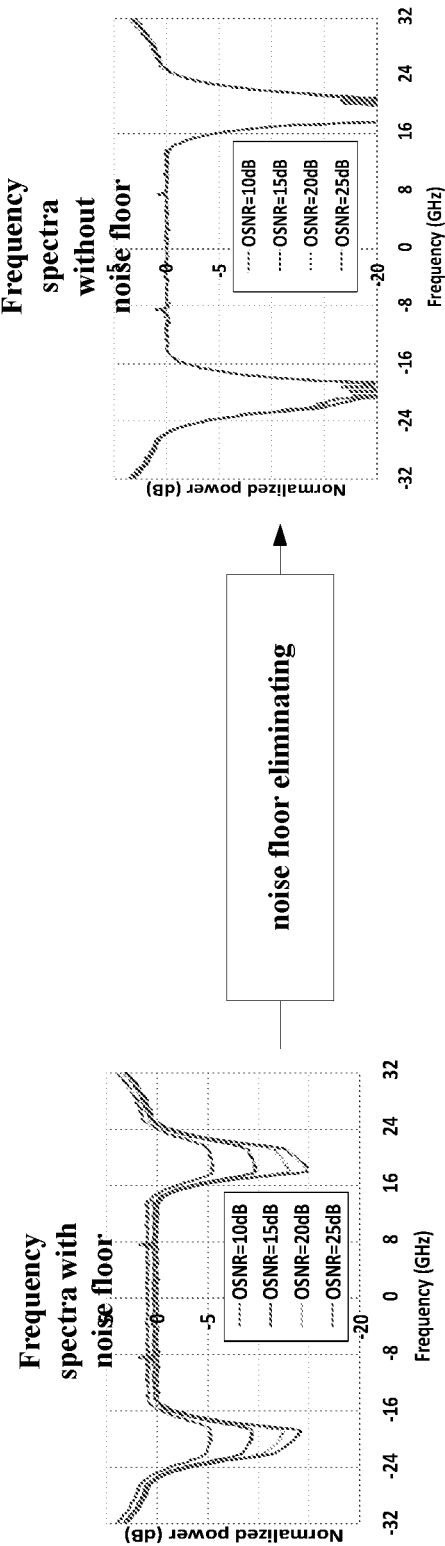
FIG. 11 is a schematic diagram of an operational principle of a noise eliminating unit of the apparatus for estimating channel power in FIG. 2.

FIG. 11 is a schematic diagram of an implementation of the noise eliminating unit 206. In this implementation, the left frequency spectrum diagram shows frequency spectrum of the receiver at different noise levels. It can be seen that different noise levels result in relatively large differences in frequency spectrum gap floor amplitudes, and such differences will also affect the precision of the power estimation. In order to avoid a phenomenon of correlation of power estimation values and noise levels, noise floor removal is performed in this embodiment by the noise eliminating unit 206 before the power estimation. A particular method is: finding a lowest point of the frequency spectrum amplitudes and taking it as the noise floor amplitude, and thereafter, deducting (linear subtraction) a value of the noise floor amplitude at each frequency point. A frequency spectrum with the noise floor being eliminated is as shown in the right frequency spectrum diagram. It can be seen that different noise levels will not affect frequency spectrum shapes, hence, the power estimation values will not dependent on the noise levels any longer.

With the apparatus of the embodiment of the present disclosure, the power of the central channel and the power of the neighboring channels may be estimated by using only frequency spectrum information obtained from a single optical receiver, so as to quantitatively evaluate influence of a power imbalance effect.

Embodiment 2

An embodiment of the present disclosure further provides a method for estimating channel power, applicable to a multicarrier optical receiver. As principles of the method for solving problems are similar to that of the apparatus of Embodiment 1, the implementation of the apparatus of Embodiment 1 may be referred to for implementation of the method, and identical contents shall not be described herein any further.

Figure 12:
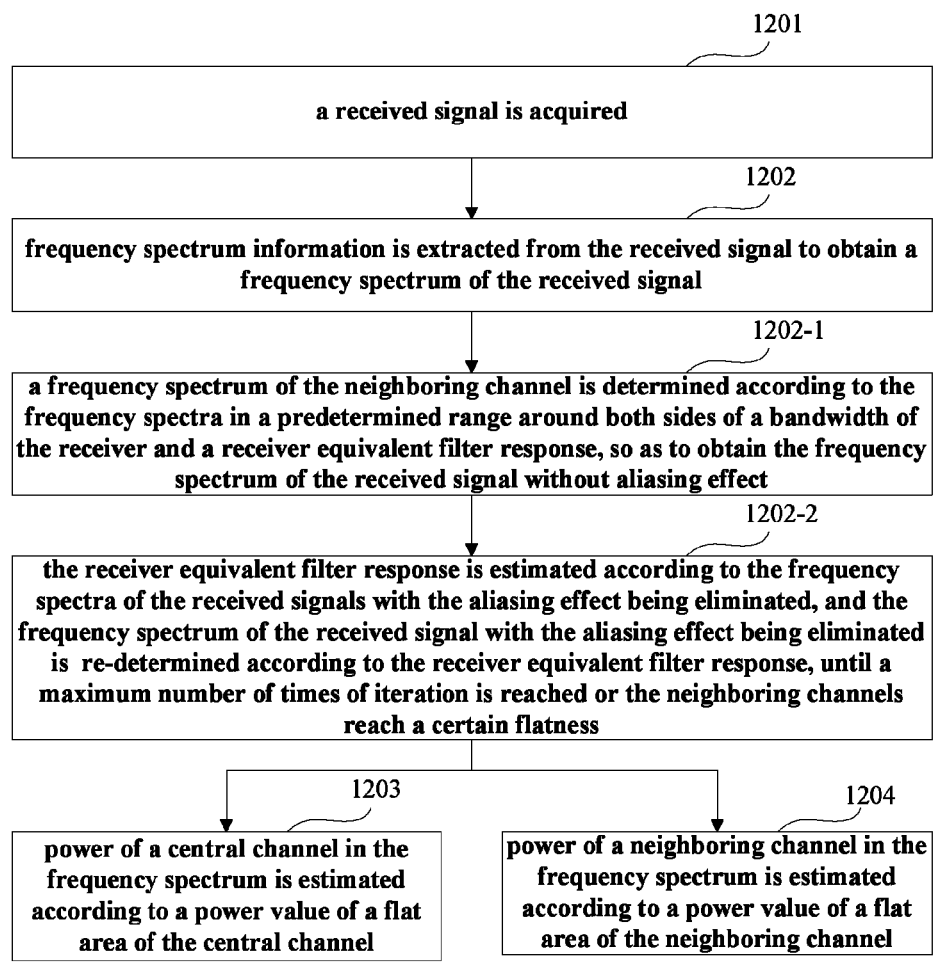
FIG. 12 is a flowchart of the method for estimating channel power of an embodiment of the present disclosure.

FIG. 12 is a flowchart of the method for estimating channel power of this embodiment. Referring to FIG. 12, the method includes:

step 1201: a received signal is acquired;

step 1202: frequency spectrum information is extracted from the received signal to obtain a frequency spectrum of the received signal;

step 1203: power of a central channel in the frequency spectrum is estimated according to a power value of a flat area of the central channel; and step 1204: power of a neighboring channel in the frequency spectrum is estimated according to a power value of a flat area of the neighboring channel.

In this embodiment, implementation order of steps 1203 and 1204 may not be limited.

Figure 13:
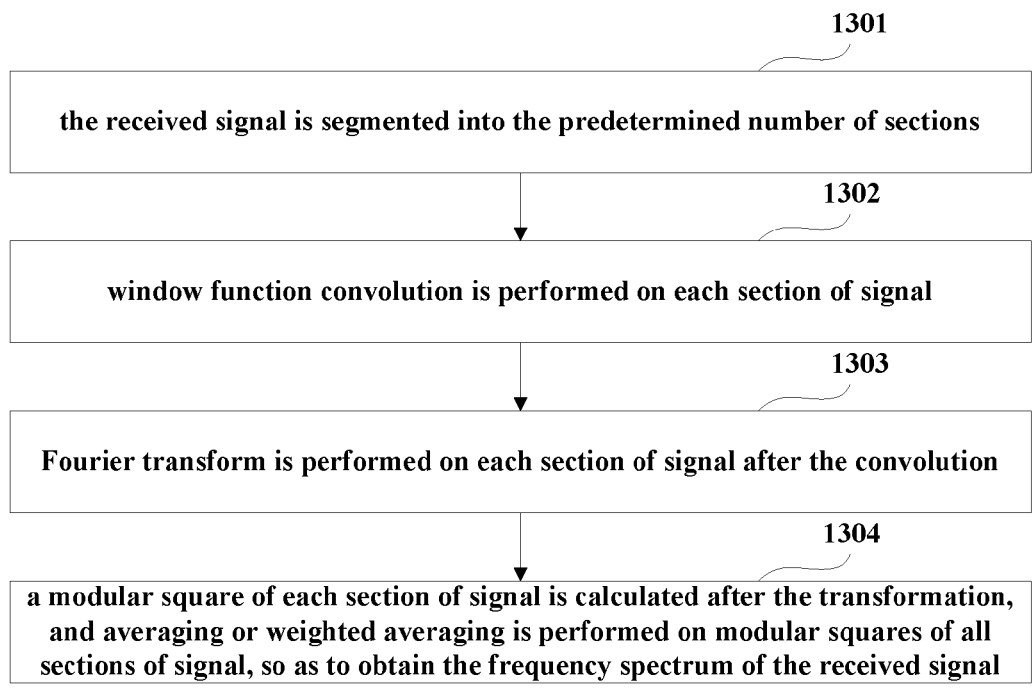
FIG. 13 is a flowchart of a method of an implementation of step 1202 in the method in FIG. 12.

In an implementation, step 1202 may be carried out by using a method shown in FIG. 13. Referring to FIG. 13, the method includes:

step 1301: the received signal is segmented into the predetermined number of sections;

step 1302: window function convolution is performed on each section of signal;

step 1303: Fourier transform is performed on each section of signal after the convolution; and step 1304: a modular square of each section of signal is calculated after the transformation, and averaging or weighted averaging is performed on modular squares of all sections of signal, so as to obtain the frequency spectrum of the received signal.

In this implementation, step 1302 is alternative.

In an implementation, after step 1202, the method may further include:

step 1202-1: a frequency spectrum of the neighboring channel is determined according to the received frequency spectrum in a predetermined range around both sides of bandwidth of the receiver and a receiver equivalent filter response, so as to obtain frequency spectrum of the received signal without aliasing effect.

In this implementation, the receiver equivalent filter response is a receiver filter response.

In another implementation, after step 1202-1, the method may further include:

step 1202-2: the receiver equivalent filter response is estimated according to the frequency spectrum of the received signal with the aliasing effect being eliminated, and the frequency spectrum of the received signal with the aliasing effect being eliminated is re-determined according to the receiver equivalent filter response, until a maximum number of times of iteration is reached or the neighboring channel reaches a certain flatness.

Figure 14:
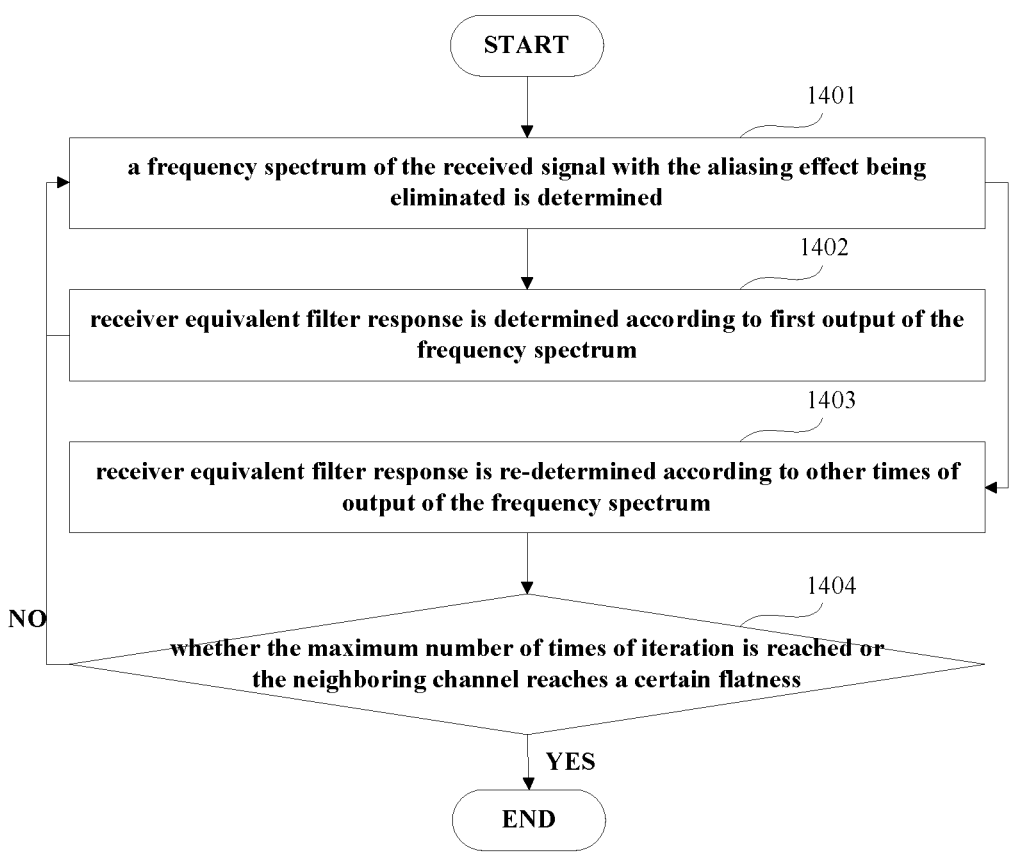
FIG. 14 is a flowchart of a method of an implementation of step 1204 in the method in FIG. 12.

FIG. 14 is a complete flowchart of determining the frequency spectrum of the received signal with the aliasing effect being eliminated. Referring to FIG. 14, the flow includes:

step 1401: a frequency spectrum of received signal with the aliasing effect being eliminated is determined; wherein, this step is carried out by step 1202-1;

step 1402: the flat area of the neighboring channel is determined according to first output of the frequency spectrum, and the receiver equivalent filter response is determined by taking power of at least one frequency point of the central channel as estimated power of the flat area of the neighboring channel, and turning back to step 1401;

step 1403: receiver equivalent filter response is re-determined according to other times of output of the frequency spectrum;

step 1404: it is judged whether the maximum number of times of iteration is reached or the neighboring channel reaches a certain flatness, and processing when it is judged yes is ended, otherwise, turning back to step 1401.

With the method of the embodiment of the present disclosure, the power of the central channel and the power of the neighboring channels may be estimated by using only frequency spectrum information obtained from a single optical receiver, so as to quantitatively evaluate influence of a power imbalance effect.

Embodiment 3

An embodiment of the present disclosure further provides a multicarrier optical receiver, including the apparatus for estimating channel power described in Embodiment 1.

Figure 15:
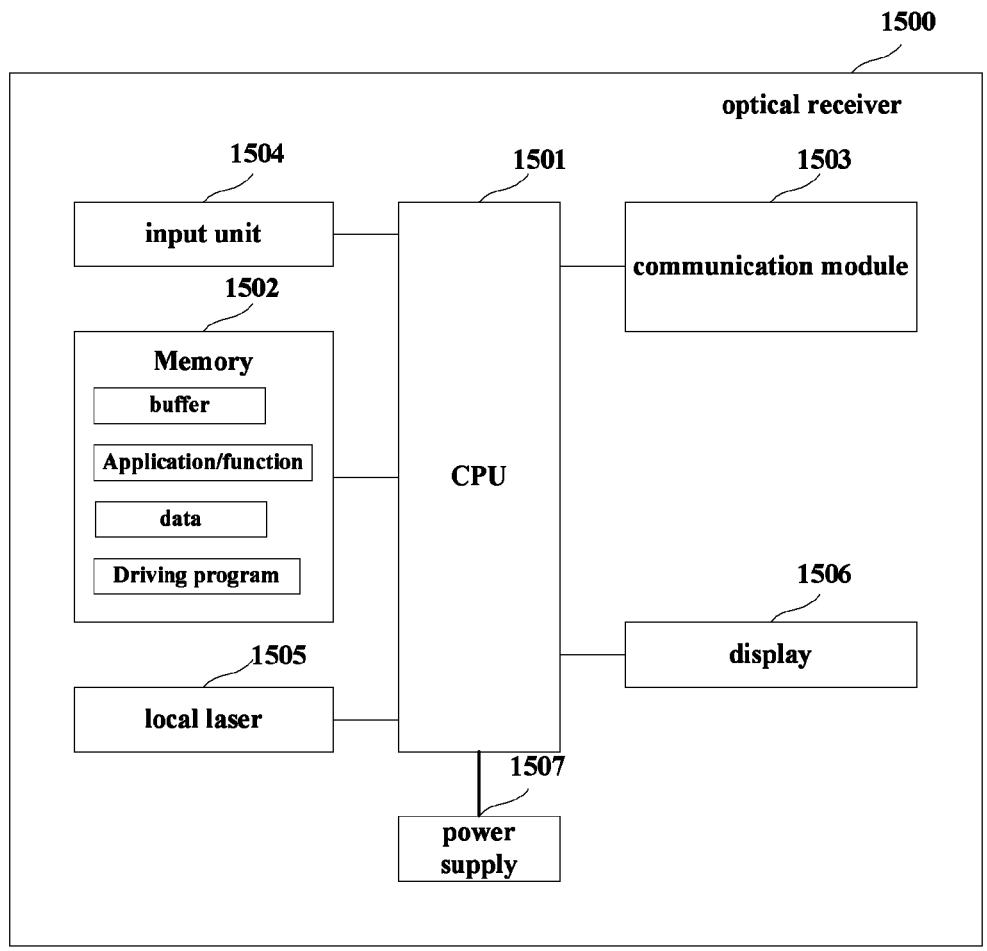
FIG. 15 is a schematic diagram of a structure of an implementation of the optical receiver of an embodiment of the present disclosure.

FIG. 15 is a schematic diagram of a structure of the optical receiver of this embodiment. As shown in FIG. 15, the optical receiver 1500 may include a central processing unit (CPU) 1501 and a memory 1502, the memory 1502 being coupled to the central processing unit 1501. It should be noted that this figure is illustrative only, and other types of structures may also be used, so as to supplement or replace this structure and achieve telecommunications function or other functions.

In an implementation, the functions of the apparatus for estimating channel power described in Embodiment 1 may be integrated into the central processing unit 1501.

In another implementation, the apparatus for estimating channel power and the central processing unit 1501 may be configured separately. For example, the apparatus for estimating channel power may be configured as a chip connected to the central processing unit 1501, with its functions being realized under control of the central processing unit 1501.

As shown in FIG. 15, the optical receiver 1500 may further include a communication module 1503, an input unit 1504, a local laser 1505, a display 1506, and a power supply 1507. It should be noted that the optical receiver 1500 does not necessarily include all the parts shown in FIG. 15, and furthermore, the optical receiver 1500 may include parts not shown in FIG. 15, and the prior art may be referred to.

As shown in FIG. 15, the central processing unit 1501 is sometimes referred to as a controller or control, and may include a microprocessor or other processor devices and/or logic devices. The central processing unit 1501 receives input and controls operations of every components of the optical receiver 1500.

In this embodiment, the memory 1502 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 1501 may execute the program stored in the memory 1502, so as to realize information storage or processing, etc. Functions of other parts are similar to those of the prior art, which shall not be described herein any further. The components of the coherent optical receiver 1500 may be realized by specific hardware, firmware, software, or any combination thereof, without departing from the scope of the present disclosure.

The optical receiver of the embodiment of the present disclosure uses only frequency spectrum information obtained from a single optical receiver to estimate the power of the central channel and the power of the neighboring channels, so as to quantitatively evaluate influence of a power imbalance effect.

Embodiment 4

Figure 16:
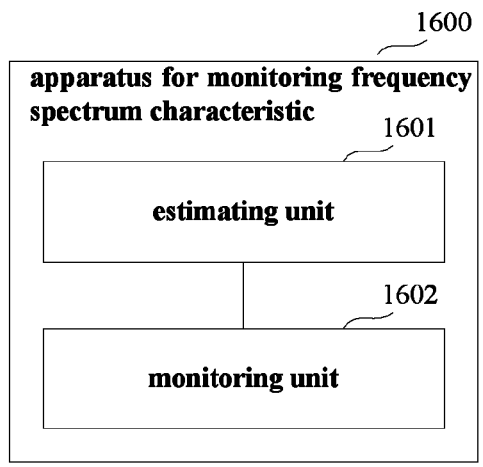
FIG. 16 is a schematic diagram of a structure of the apparatus for monitoring a frequency spectrum characteristic of an embodiment of the present disclosure.

An embodiment of the present disclosure further provides an apparatus for monitoring a frequency spectrum characteristic, applicable to a multicarrier optical receiver. FIG. 16 is a schematic diagram of a structure of the apparatus. Referring to FIG. 16, the apparatus 1600 includes an estimating unit 1601 and a monitoring unit 1602. In this embodiment, the estimating unit 1601 is configured to acquire a received signal, extract frequency spectrum information from the received signal to obtain a frequency spectrum of the received signal, estimate power of a central channel in the frequency spectrum according to a power value of a flat area of the central channel, and estimate power of a neighboring channel in the frequency spectrum according to a power value of a flat area of the neighboring channel; and the monitoring unit 1602 is configured to monitor a frequency spectrum characteristic by using the power of the central channel and the power of the neighboring channel estimated by the estimating unit 1601.

In this embodiment, the estimating unit 1601 may be realized by the apparatus for estimating channel power described in Embodiment 1. As the apparatus for estimating channel power is described in detail in Embodiment 1, the contents of which being incorporated herein, it shall not be described herein any further.

In an implementation, the estimating unit 1601 segments the received signal into the predetermined number of sections, performs window function convolution on each section of signals, performs Fourier transform on each section of signals after the convolution, calculates a modular square of each section of signals after the transformation, and performs averaging or weighted averaging on modular squares of all sections of signals, so as to obtain the frequency spectrum of the received signal.

In an implementation, the estimating unit 1601 determines a frequency spectrum of the neighboring channel according to the received frequency spectrum in a predetermined range around both sides of bandwidth of the receiver and a receiver filter response, so as to obtain the frequency spectrum of the received signal without frequency spectrum aliasing effect.

In an implementation, the estimating unit 1601 determines the frequency spectrum of the received signal with the aliasing effect being eliminated according to the received frequency spectrum in a predetermined range around both sides of bandwidth of the receiver and a receiver equivalent filter response, re-estimates a receiver equivalent filter response according to the frequency spectrum, and re-determines the frequency spectrum according to the re-estimated receiver equivalent filter response, until a maximum number of times of iteration is reached or the neighboring channel reaches a certain flatness.

In this implementation, it is assumed that the received frequency spectrum in the predetermined range around both sides of the bandwidth of the receiver is relatively flat, that is, the received frequency spectrum in the predetermined range is the flat area of the neighboring channel in the frequency spectrum.

In this embodiment, the monitoring unit 1602 monitors a frequency spectrum characteristic of a subcarrier channel by using power of the subcarrier channel estimated by the estimating unit 1601. For example, the monitoring unit 1602 may use the power of the subcarrier channel estimated by the estimating unit 1601 to monitor a signal to noise ratio, a subcarrier gap width, a bit error rate, and a crosstalk level, etc., with the prior art being referred to for a method of monitoring the estimation, which shall not be described herein any further.

With the apparatus of the embodiment of the present disclosure, the power of the central channel and the power of the neighboring channels may be estimated by using only frequency spectrum information obtained from a single optical receiver, so as to quantitatively evaluate influence of a power imbalance effect.

Embodiment 5

An embodiment of the present disclosure further provides a method for monitoring a frequency spectrum characteristic, applicable to a multicarrier optical receiver. As principles of the method for solving problems are similar to that of the apparatus of Embodiment 4, the implementation of the apparatus of Embodiment 4 may be referred to for implementation of the method, and identical contents shall not be described herein any further.

Figure 17:
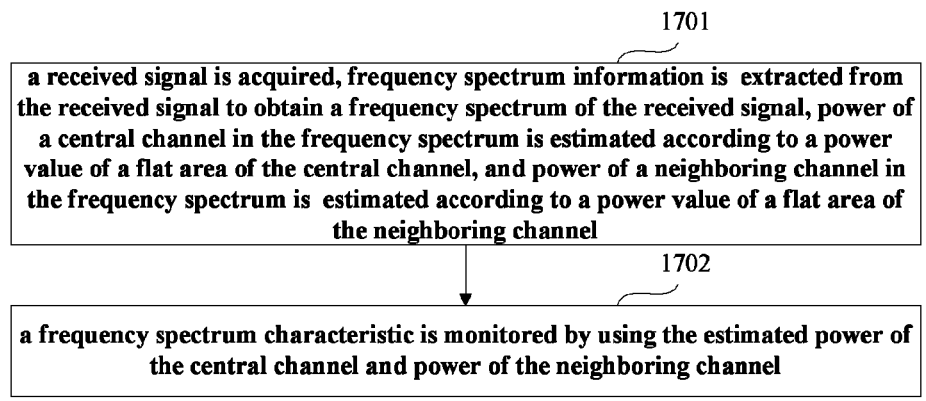
FIG. 17 is a flowchart of the method for monitoring a frequency spectrum characteristic of an embodiment of the present disclosure.

FIG. 17 is a flowchart of the method. Referring to FIG. 17, the method includes:

step 1701: a received signal is acquired, frequency spectrum information is extracted from the received signal to obtain a frequency spectrum of the received signal, power of a central channel in the frequency spectrum is estimated according to a power value of a flat area of the central channel, and power of a neighboring channel in the frequency spectrum is estimated according to a power value of a flat area of the neighboring channel; and step 1702: a frequency spectrum characteristic is monitored by using the estimated power of the central channel and power of the neighboring channel.

In this embodiment, step 1701 may be realized by the method for estimating channel power described in Embodiment 2. As the method for estimating channel power is described in detail in Embodiment 2, the contents of which being incorporated herein, it shall not be described herein any further.

In an implementation, in step 1701, the received signal is segmented into the predetermined number of sections, window function convolution is performed on each section of signals, Fourier transform is performed on each section of signals after the convolution, a modular square of each section of signals is calculated after the transformation, and averaging or weighted averaging is performed on modular squares of all sections of signals, so as to obtain the frequency spectrum of the received signal.

In an implementation, in step 1701, a frequency spectrum of the neighboring channel is determined according to the received frequency spectrum in a predetermined range around both sides of bandwidth of the receiver and a receiver filter response, so as to obtain the frequency spectrum of the received signal without frequency spectrum aliasing effect.

In an implementation, in step 1701, the received frequency spectrum of the receiver with the aliasing effect being eliminated is determined according to the frequency spectrum in a predetermined range around both sides of bandwidth of the receiver and the receiver equivalent filter response, the receiver equivalent filter response is re-estimated according to the frequency spectrum, and the frequency spectrum is re-determined according to the re-estimated receiver equivalent filter response, until a maximum number of times of iteration is reached or the neighboring channel reaches a certain flatness.

In this implementation, it is assumed that the received frequency spectrum in the predetermined range around both sides of the bandwidth of the receiver is relatively flat, that is, the received frequency spectrum in the predetermined range is the flat area of the neighboring channel in the frequency spectrum.

In this embodiment, a frequency spectrum characteristic of a subcarrier channel is monitored in step 1702 by using power of the subcarrier channel estimated in step 1701. For example, the power of the subcarrier channel estimated in step 1701 may be used in step 1702 to monitor a signal to noise ratio, a subcarrier gap width, a bit error rate, and a crosstalk level, etc., with the prior art being referred to for a method of monitoring the estimation, which shall not be described herein any further.

With the method of the embodiment of the present disclosure, the power of the central channel and the power of the neighboring channels may be estimated by using only frequency spectrum information obtained from a single optical receiver, so as to quantitatively evaluate influence of a power imbalance effect.

Embodiment 6

An embodiment of the present disclosure further provides an optical receiver, including the apparatus for monitoring a frequency spectrum characteristic described in Embodiment 4.

Figure 18:
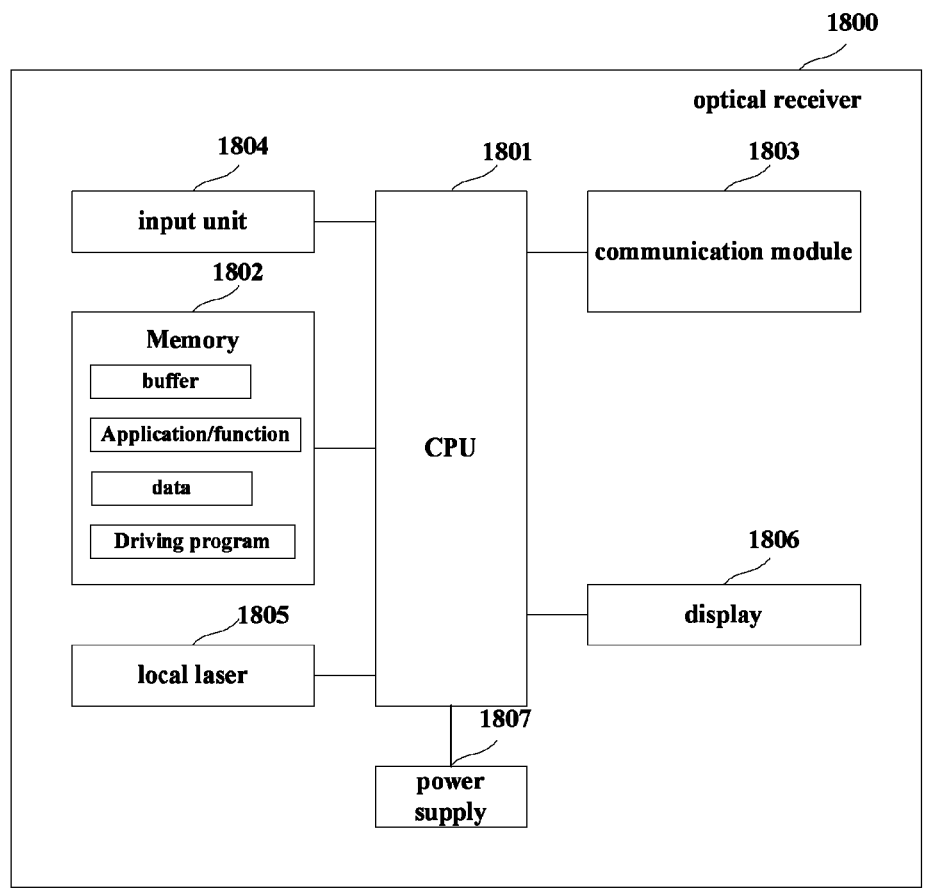
FIG. 18 is a schematic diagram of a structure of another implementation of the optical receiver of an embodiment of the present disclosure.

FIG. 18 is a schematic diagram of a structure of the optical receiver of this embodiment. As shown in FIG. 18, the optical receiver 1800 may include a central processing unit (CPU) 1801 and a memory 1802, the memory 1802 being coupled to the central processing unit 1801. It should be noted that this figure is illustrative only, and other types of structures may also be used, so as to supplement or replace this structure and achieve telecommunications function or other functions.

In an implementation, the functions of the apparatus for monitoring a frequency spectrum characteristic described in Embodiment 4 may be integrated into the central processing unit 1801.

In another implementation, the apparatus for monitoring a frequency spectrum characteristic and the central processing unit 1801 may be configured separately. For example, the apparatus for monitoring a frequency spectrum characteristic may be configured as a chip connected to the central processing unit 1801, with its functions being realized under control of the central processing unit 1801.

As shown in FIG. 18, the optical receiver 1800 may further include a communication module 1803, an input unit 1804, a local laser 1805, a display 1806, and a power supply 1807. It should be noted that the optical receiver 1800 does not necessarily include all the parts shown in FIG. 18, and furthermore, the optical receiver 1800 may include parts not shown in FIG. 18, and the prior art may be referred to.

As shown in FIG. 18, the central processing unit 1801 is sometimes referred to as a controller or control, and may include a microprocessor or other processor devices and/or logic devices. The central processing unit 1801 receives input and controls operations of every components of the optical receiver 1800.

In this embodiment, the memory 1802 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 1801 may execute the program stored in the memory 1802, so as to realize information storage or processing, etc. Functions of other parts are similar to those of the prior art, which shall not be described herein any further. The components of the coherent optical receiver 1800 may be realized by specific hardware, firmware, software, or any combination thereof, without departing from the scope of the present disclosure.

The optical receiver of the embodiment of the present disclosure uses only frequency spectrum information obtained from a single optical receiver to estimate the power of the central channel and the power of the neighboring channels, so as to quantitatively evaluate influence of a power imbalance effect.

Embodiment 7

Figure 19:
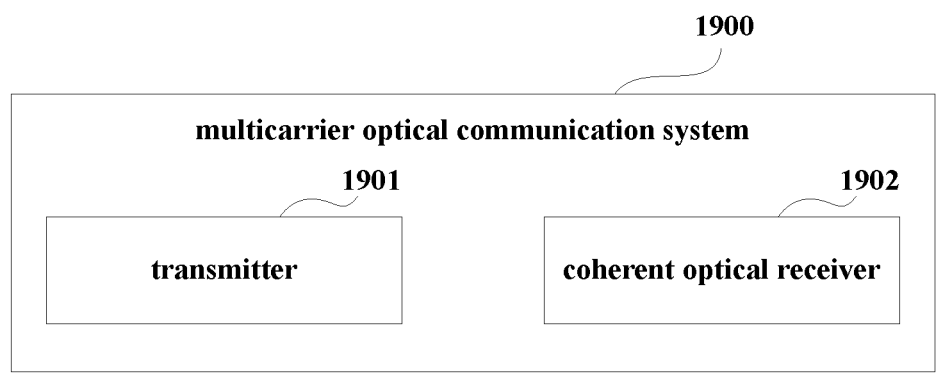
FIG. 19 is a schematic diagram of a structure of the multicarrier optical communication system of an embodiment of the present disclosure.

An embodiment of the present disclosure further provides a multicarrier optical communication system. FIG. 19 is a schematic diagram of a structure of the system. As shown in FIG. 19, the system 1900 includes a transmitter 1901 and an optical receiver 1902. In this embodiment, the optical receiver 1902 may be realized by the optical receiver described in Embodiment 3 or in Embodiment 6, the contents of which being incorporated herein, which shall not be described herein any further.

With the multicarrier optical communication system of the embodiment of the present disclosure, the power of the central channel and the power of the neighboring channels may be estimated by using only frequency spectrum information obtained from a single optical receiver, so as to quantitatively evaluate influence of a power imbalance effect.

An embodiment of the present disclosure further provides a computer-readable program, wherein when the program is executed in an apparatus for estimating channel power or an optical receiver, the program enables a computer to carry out the method as described in Embodiment 2 in the apparatus for estimating channel power or the optical receiver.

An embodiment of the present disclosure provides a storage medium in which a computer-readable program is stored, wherein the computer-readable program enables a computer to carry out the method as described in Embodiment 2 in an apparatus for estimating channel power or an optical receiver.

An embodiment of the present disclosure further provides a computer-readable program, wherein when the program is executed in an apparatus for monitoring a frequency spectrum characteristic or an optical receiver, the program enables a computer to carry out the method as described in Embodiment 5 in the apparatus for monitoring a frequency spectrum characteristic or the optical receiver.

An embodiment of the present disclosure provides a storage medium in which a computer-readable program is stored, wherein the computer-readable program enables a computer to carry out the method as described in Embodiment 5 in an apparatus for monitoring a frequency spectrum characteristic or an optical receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

For the implementation of the present disclosure containing the above embodiments, following supplements are further disclosed.

Supplement 1. An apparatus for estimating channel power, applicable to an optical receiver, the apparatus including an acquiring unit configured to acquire a received signal; an extracting unit configured to extract frequency spectrum information from the received signal to obtain a frequency spectrum of the received signal; a first estimating unit configured to estimate power of a central channel in the frequency spectrum according to a power value of a flat area of the central channel; and a second estimating unit configured to estimate power of a neighboring channel in the frequency spectrum according to a power value of a flat area of the neighboring channel.

Supplement 2. The apparatus according to supplement 1, wherein the extracting unit includes a segmenting module configured to segment the received signal into the predetermined number of sections; a transforming module configured to perform Fourier transform on each section of signal; and a calculating module configured to calculate a modular square of each section of signals, and perform averaging or weighted averaging on modular squares of all sections of signal to obtain the frequency spectrum of the received signal.

Supplement 3. The apparatus according to supplement 2, wherein the extracting unit further includes a convolution module located between the segmenting module and the transforming module and configured to perform window function convolution on each section of signals.

Supplement 4. The apparatus according to supplement 1, wherein the apparatus further includes a frequency spectrum recovering unit configured to perform frequency spectrum recovery on the frequency spectrum of the received signal extracted by the extracting unit; and wherein the first estimating unit determines the flat area of the central channel according to a frequency spectrum recovered by the frequency spectrum recovering unit, and estimates a power value of the central channel according to the flat area of the central channel; and the second estimating unit determines the flat area of the neighboring channel according to a frequency spectrum recovered by the frequency spectrum recovering unit, and estimates the power of the neighboring channel according to the flat area of the neighboring channel.

Supplement 5. The apparatus according to supplement 4, wherein the frequency spectrum recovering unit includes a frequency spectrum aliasing eliminating module configured to determine a frequency spectrum of the neighboring channel according to the received frequency spectrum in a predetermined range around both sides of bandwidth of the receiver and a receiver filter response or a receiver equivalent filter response, so as to obtain the frequency spectrum of the received signal without frequency spectrum aliasing effect.

Supplement 6. The apparatus according to supplement 4, wherein the second determining unit further includes a receiver equivalent filter estimating module configured to estimate the receiver equivalent filter response according to output of the frequency spectrum aliasing eliminating module, and provide the receiver equivalent filter response to the frequency spectrum aliasing eliminating module, until a maximum number of times of iteration is reached or the neighboring channel reaches a certain flatness.

Supplement 7. The apparatus according to supplement 6, wherein the estimating module includes a first determining module configured to determine the flat area of the neighboring channel according to first output of the frequency spectrum aliasing eliminating module, determine receiver equivalent filter response by taking power of at least one frequency point of the central channel as estimated power of the flat area of the neighboring channel, and provide the receiver equivalent filter response to the frequency spectrum aliasing eliminating module; a second determining module configured to re-determine receiver equivalent filter response according to other times of output of the frequency spectrum aliasing eliminating module; a judging module configured to judge whether the maximum number of times of iteration is reached or the neighboring channel reaches a certain flatness; and a processing module configured to end processing when it is judged yes by the judging module, and provide the receiver equivalent filter response re-determined by the second determining module to the frequency spectrum aliasing eliminating module for further processing when it is judged no by the judging module.

Supplement 8. The apparatus according to supplement 4, wherein the apparatus further includes a noise eliminating unit configured to determine a noise floor amplitude of the frequency spectrum recovered by the frequency spectrum recovering unit, deduct a value of the noise floor amplitude from each frequency point of the frequency spectrum to obtain signals with noises being eliminated, and provide the signals to the first estimating unit and the second estimating unit.

Supplement 9. An apparatus for monitoring a frequency spectrum characteristic, applicable to an optical receiver, the apparatus including an estimating unit configured to acquire a received signal, extract frequency spectrum information from the received signal to obtain a frequency spectrum of the received signal, determine power of a central channel in the frequency spectrum according to a power value of a flat area of the central channel, and determine power of a neighboring channel in the frequency spectrum according to a power value of a flat area of the neighboring channel; and a monitoring unit configured to monitor a frequency spectrum characteristic by using the power of the central channel and the power of the neighboring channel estimated by the estimating unit.

Supplement 10. The apparatus according to supplement 9, wherein the estimating unit segments the received signal into the predetermined number of sections, performs Fourier transform on each section of signals, calculates a modular square of each section of signals after the transformation, and performs averaging or weighted averaging on modular squares of all sections of signals, so as to obtain the frequency spectrum of the received signal.

Supplement 11. The apparatus according to supplement 9, wherein the estimating unit segments the received signal into the predetermined number of sections, performs window function convolution on each section of signals, performs Fourier transform on each section of signals after the convolution, calculates a modular square of each section of signals after the transformation, and performs averaging or weighted averaging on modular squares of all sections of signals, so as to obtain the frequency spectrum of the received signal.

Supplement 12. The apparatus according to supplement 9, wherein the estimating unit determines a frequency spectrum of the neighboring channel according to the received frequency spectrum in a predetermined range around both sides of bandwidth of the receiver and a receiver equivalent filter response, so as to obtain the frequency spectrum of the received signal without frequency spectrum aliasing effect, re-estimates receiver equivalent filter response according to the frequency spectrum of the received signal without frequency spectrum aliasing effect, and re-determines the frequency spectrum of the received signal without frequency spectrum aliasing effect according to the re-estimated receiver equivalent filter response, until a maximum number of times of iteration is reached or the neighboring channel reaches a certain flatness.

Supplement 13. The apparatus according to supplement 9, wherein the estimating unit determines a frequency spectrum of the neighboring channel according to the received frequency spectrum in a predetermined range around both sides of bandwidth of the receiver and a receiver filter response, so as to obtain the frequency spectrum of the received signal without frequency spectrum aliasing effect.

Supplement 14. The apparatus according to supplement 9, wherein the monitoring unit is configured to use the power of the central channel and the power of the neighboring channels to monitor a signal to noise ratio of a subcarrier channel, a subcarrier gap width between subcarriers, a bit error rate, and a crosstalk level.

Supplement 15. An optical receiver, including an apparatus for monitoring a frequency spectrum characteristic, the apparatus for monitoring a frequency spectrum characteristic being configured to acquire a received signal, extract frequency spectrum information from the received signal to obtain a frequency spectrum of the received signal, estimate power of a central channel in the frequency spectrum according to a power value of a flat area of the central channel, and estimate power of a neighboring channel in the frequency spectrum according to a power value of a flat area of the neighboring channel; and monitor a frequency spectrum characteristic by using the estimated power of the central channel and the estimated power of the neighboring channel.

Supplement 16. The optical receiver according to supplement 15, wherein the apparatus for monitoring a frequency spectrum characteristic is configured to segment the received signal into the predetermined number of sections, perform Fourier transform on each section of signals, calculate a modular square of each section of signals after the transformation, and perform averaging or weighted averaging on modular squares of all sections of signals, so as to obtain the frequency spectrum of the received signal.

Supplement 17. The optical receiver according to supplement 15, wherein the apparatus for monitoring a frequency spectrum characteristic is configured to segment the received signal into the predetermined number of sections, perform window function convolution on each section of signals, perform Fourier transform on each section of signals after the convolution, calculate a modular square of each section of signals after the transformation, and perform averaging or weighted averaging on modular squares of all sections of signals, so as to obtain the frequency spectrum of the received signal.

Supplement 18. The optical receiver according to supplement 15, wherein the apparatus for monitoring a frequency spectrum characteristic is configured to determine a frequency spectrum of the neighboring channel according to the received frequency spectrum in a predetermined range around both sides of bandwidth of the receiver and a receiver equivalent filter response, so as to obtain the frequency spectrum of the received signal without frequency spectrum aliasing effect, re-estimate receiver equivalent filter response according to the frequency spectrum of the received signal without frequency spectrum aliasing effect, and re-determine the frequency spectrum of the received signal without frequency spectrum aliasing effect according to the re-estimated receiver equivalent filter response, until a maximum number of times of iteration is reached or the neighboring channel reaches a certain flatness.

Supplement 19. The optical receiver according to supplement 15, wherein the apparatus for monitoring a frequency spectrum characteristic is configured to determine a frequency spectrum of the neighboring channel according to the received frequency spectrum in a predetermined range around both sides of bandwidth of the receiver and a receiver filter response, so as to obtain the frequency spectrum of the received signal without frequency spectrum aliasing effect.

Supplement 20. The optical receiver according to supplement 15, wherein the apparatus for monitoring a frequency spectrum characteristic is configured to use the power of the central channel and the power of the neighboring channel to monitor a signal to noise ratio of a subcarrier channel, a subcarrier gap width between subcarriers, a bit error rate, and a crosstalk level.

While the present disclosure has been particularly shown and described with reference to embodiments thereof, it will be understood by those of ordinary skill in the art that various changes in form and details may be made therein without departing from the spirit and scope of the present disclosure as defined by the following claims.

What is claimed is:

1. An apparatus for estimating channel power, applicable to an optical receiver, the apparatus comprising:
   an acquiring unit configured to acquire a received signal;
   an extracting unit configured to extract frequency spectrum information from the received signal to obtain a frequency spectrum of the received signal;
   a first estimating unit configured to estimate power of a central channel in the frequency spectrum according to a power value of a flat area of the central channel; and
   a second estimating unit configured to estimate power of a neighboring channel in the frequency spectrum according to a power value of a flat area of the neighboring channel,
   wherein the apparatus further comprises:
   a frequency spectrum recovering unit configured to perform frequency spectrum recovery on the frequency spectrum of the received signal obtained by the extracting unit; and
   wherein the first estimating unit determines the flat area of the central channel according to the frequency spectrum recovered by the frequency spectrum recovering unit, and estimates a power value of the central channel according to the flat area of the central channel; and
   the second estimating unit determines the flat area of the neighboring channel according to the frequency spectrum recovered by the frequency spectrum recovering unit, and estimates the power of the neighboring channel according to the flat area of the neighboring channel.

2. The apparatus according to claim 1, wherein the extracting unit comprises:
   a segmenting module configured to segment the received signal into a predetermined number of sections;
   a transforming module configured to perform Fourier transform on each section of signal; and
   a calculating module configured to calculate a modular square of each section of signal, and perform averaging or weighted averaging on modular squares of all sections of the segmented signal to obtain the frequency spectrum of the received signal.

3. The apparatus according to claim 2, wherein the extracting unit further comprises:
a convolution module located between the segmenting module and the transforming module and configured to perform window function convolution on each section of signal.

4. The apparatus according to claim 1, wherein the frequency spectrum recovering unit comprises:
a frequency spectrum aliasing eliminating module configured to determine a frequency spectrum of the neighboring channel according to received frequency spectrum in a predetermined range around both sides of bandwidth of the optical receiver and a receiver filter response or a receiver equivalent filter response, so as to obtain the frequency spectrum of the received signal without frequency spectrum aliasing effect.

5. The apparatus according to claim 4, wherein the frequency spectrum recovering unit further comprises:
a receiver equivalent filter estimating module configured to estimate the receiver equivalent filter response according to an output of the frequency spectrum aliasing eliminating module, and provide the receiver equivalent filter response to the frequency spectrum aliasing eliminating module, until a maximum number of times of iteration is reached or the neighboring channel reaches a certain level of flatness.

6. The apparatus according to claim 5, wherein the receiver equivalent filter estimating module comprises:
a first determining module configured to determine the flat area of the neighboring channel according to a first output of the frequency spectrum aliasing eliminating module, determine the receiver equivalent filter response by taking power of at least one frequency point of the central channel as estimated power of the flat area of the neighboring channel, and provide the receiver equivalent filter response to the frequency spectrum aliasing eliminating module;
a second determining module configured to re-determine the receiver equivalent filter response according to other outputs of the frequency spectrum aliasing eliminating module;
a judging module configured to judge whether the maximum number of times of iteration is reached or the neighboring channel reaches the certain level of flatness; and
a processing module configured to end processing when judging the maximum number of times of iteration is reached or the neighboring channel reaches the certain level of flatness by the judging module, and provide the receiver equivalent filter response re-determined by the second determining module to the frequency spectrum aliasing eliminating module for further processing when the judging module judges the number of times of iteration is other than the maximum number of times or the neighboring channel remains below the certain level of flatness.

7. The apparatus according to claim 1, wherein the apparatus further comprises:
a noise eliminating unit configured to determine a noise floor amplitude of the frequency spectrum recovered by the frequency spectrum recovering unit, deduct a value of the noise floor amplitude from each frequency point of the frequency spectrum to obtain signals with noises being eliminated, and provide the signals to the first estimating unit and the second estimating unit.

8. An apparatus for monitoring a frequency spectrum characteristic, applicable to an optical receiver, the apparatus comprising:
an estimating unit configured to acquire a received signal, extract frequency spectrum information from the received signal to obtain a frequency spectrum of the received signal, determine power of a central channel in the frequency spectrum according to a power value of a flat area of the central channel, and determine power of a neighboring channel in the frequency spectrum according to a power value of a flat area of the neighboring channel; and
a monitoring unit configured to monitor a frequency spectrum characteristic by using the power of the central channel and the power of the neighboring channel estimated by the estimating unit,
the estimating unit determines the flat area of the central channel according to the frequency spectrum recovered by performing frequency spectrum recovery on the frequency spectrum of the received signal, and estimates a power value of the central channel according to the flat area of the central channel;
and the estimating unit determines the flat area of the neighboring channel according to the frequency spectrum recovered by performing frequency spectrum recovery on the frequency spectrum of the received signal, and estimates the power of the neighboring channel according to the flat area of the neighboring channel.

9. The apparatus according to claim 8, wherein the estimating unit segments the received signal into a predetermined number of sections, performs Fourier transform on each section of signal, calculates a modular square of each section of signal after the transformation, and performs averaging or weighted averaging on modular squares of all sections of the segmented signal, so as to obtain the frequency spectrum of the received signal.

10. The apparatus according to claim 8, wherein the estimating unit segments the received signal into a predetermined number of sections, performs window function convolution on each section of signal, performs Fourier transform on each section of signal after the convolution, calculates a modular square of each section of signal after the transformation, and performs averaging or weighted averaging on modular squares of all sections of the segmented signal, so as to obtain the frequency spectrum of the received signal.

11. The apparatus according to claim 8, wherein the estimating unit:
determines a frequency spectrum of the neighboring channel according to received frequency spectrum in a predetermined range around both sides of bandwidth of the optical receiver and a receiver equivalent filter response, so as to obtain the frequency spectrum of the received signal without frequency spectrum aliasing effect,
re-estimates receiver equivalent filter response according to the frequency spectrum of the received signal without frequency spectrum aliasing effect, and
re-determines the frequency spectrum of the received signal without frequency spectrum aliasing effect according to the re-estimated receiver equivalent filter response, until a maximum number of times of iteration is reached or the neighboring channel reaches a certain level of flatness.

12. The apparatus according to claim 8, wherein the estimating unit determines a frequency spectrum of the neighboring channel according to received frequency spectrum in a predetermined range around both sides of bandwidth of the optical receiver and a receiver filter response, so as to obtain the frequency spectrum of the received signal without frequency spectrum aliasing effect.

13. The apparatus according to claim 8, wherein the monitoring unit is configured to use the power of the central channel and the power of the neighboring channels to monitor a signal to noise ratio of a subcarrier channel, a subcarrier gap width between subcarriers, a bit error rate, and a crosstalk level.

14. An optical receiver, comprising:
an apparatus for monitoring a frequency spectrum characteristic, the apparatus for monitoring a frequency spectrum characteristic being configured to:
acquire a received signals, extract frequency spectrum information from the received signal to obtain a frequency spectrum of the received signal, estimate power of a central channel in the frequency spectrum according to a power value of a flat area of the central channel, and estimate power of a neighboring channel in the frequency spectrum according to a power value of a flat area of the neighboring channel; and
monitor a frequency spectrum characteristic by using the estimated power of the central channel and the estimated power of the neighboring channel,
wherein the apparatus for monitoring a frequency spectrum characteristic is configured to;
determine the flat area of the central channel according to the frequency spectrum recovered by performing frequency spectrum recovery on the frequency spectrum of the received signal, and estimate a power value of the central channel according to the flat area of the central channel; and
determine the flat area of the neighboring channel according to the frequency spectrum recovered by performing frequency spectrum recovery on the frequency spectrum of the received signal, and estimate the power of the neighboring channel according to the flat area of the neighboring channel.

15. The optical receiver according to claim 14, wherein the apparatus for monitoring a frequency spectrum characteristic is configured to segment the received signal into a predetermined number of sections, perform Fourier transform on each section of signal, calculate a modular square of each section of signal after the transformation, and perform averaging or weighted averaging on modular squares of all sections of the segmented signal, so as to obtain the frequency spectrum of the received signal.

16. The optical receiver according to claim 14, wherein the apparatus for monitoring a frequency spectrum characteristic is configured to segment the received signal into a predetermined number of sections, perform window function convolution on each section of signals, perform Fourier transform on each section of signal after the convolution, calculate a modular square of each section of signal after the transformation, and perform averaging or weighted averaging on modular squares of all sections of the segmented signal, so as to obtain the frequency spectrum of the received signal.

17. The optical receiver according to claim 14, wherein the apparatus for monitoring a frequency spectrum characteristic is configured to:
determine a frequency spectrum of the neighboring channel according to the received frequency spectrum in a predetermined range around both sides of bandwidth of the receiver and a receiver equivalent filter response, so as to obtain the frequency spectrum of the received signal without frequency spectrum aliasing effect,
re-estimate receiver equivalent filter response according to the frequency spectrum of the received signal without frequency spectrum aliasing effect, and
re-determine the frequency spectrum of the received signal without frequency spectrum aliasing effect according to the re-estimated receiver equivalent filter response, until a maximum number of times of iteration is reached or the neighboring channel reaches a certain level of flatness.

18. The optical receiver according to claim 14, wherein the apparatus for monitoring a frequency spectrum characteristic is configured to determine a frequency spectrum of the neighboring channel according to the received frequency spectrum in a predetermined range around both sides of bandwidth of the optical receiver and a receiver filter response, so as to obtain the frequency spectrum of the received signal without frequency spectrum aliasing effect.

19. The optical receiver according to claim 14, wherein the apparatus for monitoring a frequency spectrum characteristic is configured to use the power of the central channel and the power of the neighboring channel to monitor a signal to noise ratio of a subcarrier channel, a subcarrier gap width between subcarriers, a bit error rate, and a crosstalk level.

* * * * *